(No Model.)

C. P. SYKES.
Gearing for Vehicles.

No. 243,173 — Patented June 21, 1881.

WITNESSES.
S. E. Thomas.
Fred. O. Paige.

Casper P. Sykes, INVENTOR.
By W. W. Leggett, ATTORNEY.

UNITED STATES PATENT OFFICE.

CASPER P. SYKES, OF PINCKNEY, MICHIGAN.

GEARING FOR VEHICLES.

SPECIFICATION forming part of Letters Patent No. 243,173, dated June 21, 1881.

Application filed December 14, 1880. (No model.)

*To all whom it may concern:*

Be it known that I, CASPER P. SYKES, of Pinckney, county of Livingston, State of Michigan, have invented a new and useful Improvement in Gearing for Vehicles; and I declare the following to be a full, clear, and exact description of the invention, such as will enable others skilled in the art to which it pertains to make and use it, reference being had to the accompanying drawings, which form a part of this specification.

My invention consists, essentially, in providing a vehicle with two or more longitudinal springs extending from the rear axle to a frame beneath the forward axle, and connecting said springs intermediate of their length with the body of the vehicle; also, in providing a vehicle with springs leading from beneath its body to the extremities of the bolster or head-block at the forward end, and similar springs connecting the body with the extremities of the rear axle, as will be hereinafter more fully described, and pointed out in the claims.

Figure 1:
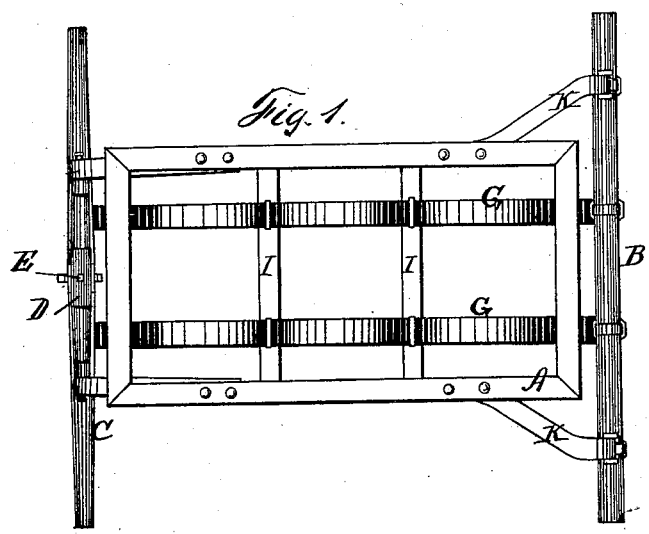
Figure 2:
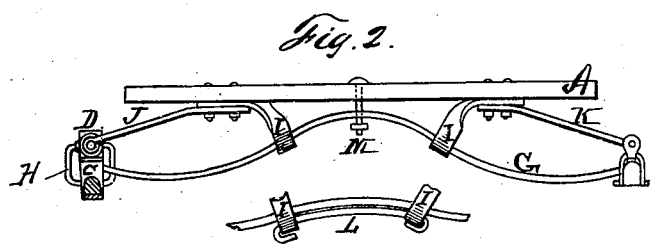
Figure 3:
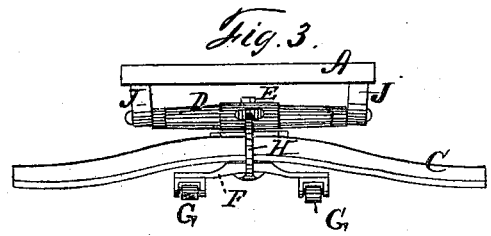

In the drawings, Figure 1 is a plan view, and Fig. 2 a side elevation, of a vehicle embodying my invention. Fig. 3 is a front elevation.

Heretofore in making vehicles with longitudinal springs it has been customary to connect the forward ends direct with the bolster or head-block; but such constructions have necessitated the raising of the body to a considerable height.

It is the object of my invention to make a construction which shall permit the body to rest as low as may be desired and still secure the advantages of the longitudinal springs extending from front to rear, and derive, also, the advantage of springs extending to the bolster or head-block.

In carrying out my invention, A represents the bed of the vehicle, there being shown in the drawings simply the sills or frame-work of the body. B is the rear axle; C, the forward axle; D, the bolster or head-block; E, a king-bolt; F, the frame beneath the axle to which the forward ends of the longitudinal springs are attached. The springs G start from the rear axle, as indicated, and curve upward nearly to the bed of the vehicle at the middle point, and extend forward and are attached to the frame F beneath the forward axle. This frame F has upon its upper side a good bearing of several inches upon the upper axle, so as to insure steadiness against lateral motion. The frame may be supported primarily by the king-bolt; but in order to insure safety I prefer to employ a loop or clip, H, which is secured firmly to the head-block above, and is secured to or embraces the frame beneath the axle, the loop being left sufficiently open, midway, to allow the free play of the forward axle therein.

At points intermediate between the extremities of the long springs are connections I, whereby the springs are attached to the body of the vehicle.

J represents springs, which are attached at their rear ends to the body of the vehicle, and projecting forward are attached to the head-block or bolster by a suitable pivotal connection.

K represents similar springs extending from the body of the vehicle back, and connecting with the rear axle, preferably near its extremities. These give great steadiness to the body and prevent side motion. The rear springs, K', are connected preferably with the top of the axle, so as to prevent any liability of rocking. The longitudinal springs being fastened beneath the rear axle, while the springs K are attached above, insure a perfect guard against any liability of there ar axle to turn about its axis.

At the middle point of each of the longitudinal springs I prefer to provide a hole for the passage of a bolt, M, which connects the spring or springs at these points with the body of the vehicle. The bolts pass loosely through the holes, and are provided at a little distance below with nuts, the object being to permit the springs to yield freely for light loads; but when the vehicle is loaded heavily the springs will descend and bear against the nuts, thus rendering the springs rigid at their middle portions, and throw the strain upon the springs at points intermediate between the bolts and the axles.

If necessary, the braces I may be connected with each other by any suitable connection, to prevent any liability of their separating when the vehicle is in use, because it is apparent that there would be a slight tendency of these braces to separate and slide toward the front and rear axles, respectively, were it not for some such connection. This latter device, however, may or may not be employed; but, if employed, the connection might be in the nature of an extra leaf located beneath the longitudinal spring, and having its ends caught around the cross-brace I, as shown in the separate view beneath Fig. 2 at L.

A vehicle with springs as herein described is very steady, and yet very strong, the springs are out of the way, the body can be located as low as desired, and all swaying of the body of the vehicle when in use is avoided.

I have described the parts connecting the lower portion of the body with the extremities of the head-blocks or bolster, and also the parts connecting the rear portion of the body with the extremities of the rear axle as springs. I prefer, generally, that they should be in the nature of springs; but it is not essential, for these parts may be made of steel or other rigid metal, the object being more particularly to hold the forward and rear axles against any tendency to rotate about their axis and to keep the body from swaying sidewise.

What I claim is—

1. The combination, with the vehicle-body, of the two springs G G, arranged parallel with each other and connected with the rear axle and with the outer ends of a frame arranged beneath the front axle and supported from the head-block, substantially as described.

2. The combination of the vehicle-body with the springs G G, arranged parallel with each other and connecting the rear axle with a frame supported below the front axle, the braces I I, connecting said springs with the vehicle-body, and the bolts M, extending down from the vehicle-body, through openings in the springs, substantially as described.

3. The combination, with the vehicle-body, of the two parallel springs G G, connecting the rear axle with a frame below the front axle, the springs connecting the vehicle-body with the front axle at the sides of the springs G, and the diagonal springs K, connecting the vehicle-body with the rear axle, all substantially as described.

In testimony whereof I sign this specification in the presence of two witnesses.

CASPER P. SYKES.

Witnesses:
T. C. MOSS,
WM. M. PORTER.